Patented Nov. 15, 1932

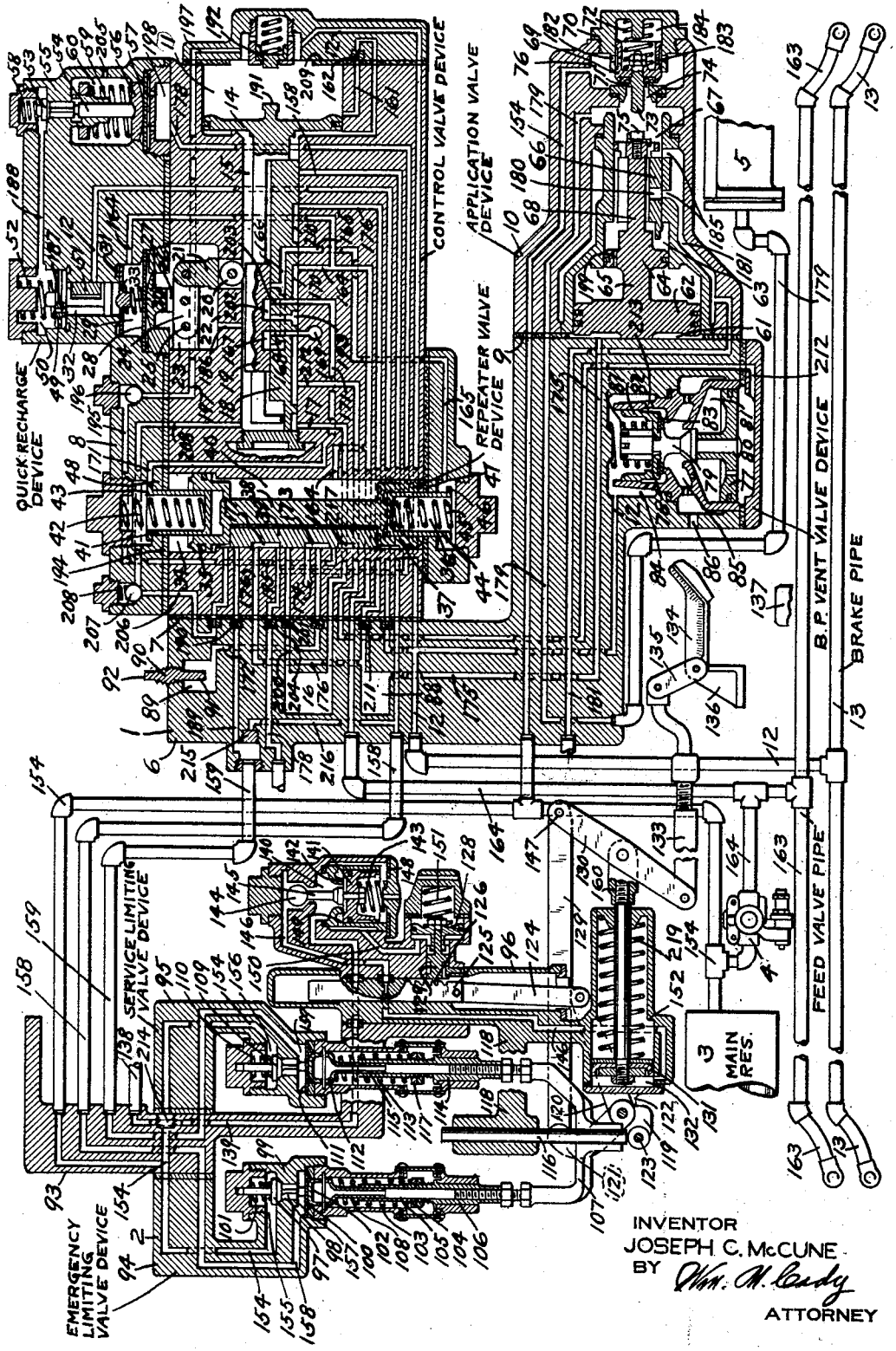

1,887,597

UNITED STATES PATENT OFFICE

JOSEPH C. McCUNE, OF EDGEWOOD, PENNSYLVANIA, ASSIGNOR TO THE WESTINGHOUSE AIR BRAKE COMPANY, OF WILMERDING, PENNSYLVANIA, A CORPORATION OF PENNSYLVANIA

FLUID PRESSURE BRAKE

Application filed September 24, 1929. Serial No. 394,807.

This invention relates to fluid pressure brakes, and more particularly to a brake controlling mechanism.

One object of my invention is to provide an improved brake controlling mechanism which is operative to effect a quick application of the brakes, as well as a quick release of the brakes.

Another object of my invention is to provide a brake controlling mechanism of the above type in which the braking power on a vehicle is varied automatically in proportion to the load carried by the vehicle.

Other objects and advantages will appear in the following more detailed description of my invention.

In the accompanying drawing, the single figure is a diagrammatic view, partly in section, of a fluid pressure brake equipment embodying my invention.

As shown in the drawing, the fluid pressure brake equipment comprises a brake controlling valve device 1, a brake cylinder supply pressure limiting valve device 2, a main reservoir 3, a feed valve device 4 and a brake cylinder 5.

The brake controlling valve device 1 comprises a pipe bracket 6 containing a brake pipe vent valve mechanism and having a gasket face 7 upon which is mounted a control valve device 8 and a gasket face 9 upon which is mounted an application valve device 10.

The control valve device 8 comprises a casing having a chamber 11 connected through a pipe and passage 12 to a brake pipe 13 and containing an equalizing piston 14, and a chamber 15 connected to an operating reservoir volume 16 through a passage 17, and containing a main slide valve 18 and an auxiliary slide valve 19 adapted to be operated by said piston.

Engaging the upper face of the auxiliary slide valve 19 is a roller 20 mounted on a vertically disposed plunger like member 21, which is adapted to slidably operate through a suitable opening in a partition wall 22, which wall separates a chamber 23 from the valve chamber 15. The member 21 is pivotally secured at its upper end to a lever 24 pivoted on a pin 25 in the casing. Intermediate the pin 25 and member 21, the stem 26 of a diaphragm follower 27 is pivotally secured to the lever 24 and is adapted to turn said lever on the pin 25 by the deflection of a diaphragm 28 engaging the upper face of said follower, said diaphragm being subject on the lower side to the pressure of fluid in chamber 23 and on the upper side to the pressure of fluid in a chamber 29, in addition to the pressure of a light spring 30 interposed between said diaphragm and a perforated disc 31, the perforations 33 in said disc establishing communication between chamber 29 and a chamber 32. The pressure of said spring 30 is substantially negligible in so far as the operation of the equipment is concerned, said spring being provided to hold the slide valves 18 and 19 seated, when the equipment is uncharged, as during transit.

The casing of the control valve device also has a chamber 34 containing a repeater valve piston 35 and a chamber 36 containing a repeater valve piston 37, the pistons 35 and 37 being connected by a stem 38. Interposed between shoulders on the inner faces of said pistons is a slide valve 39 contained in a chamber 40 and adapted to be actuated by said pistons.

Slidably mounted in a cavity in the upper face of the repeater valve piston 35 is a plunger 41, which is urged downwardly by a spring 42, such downward movement being limited by the engagement of a collar 43 on said plunger with a wall 48 in the casing. Also slidably mounted in a cavity in the lower face of the repeater valve piston 37 is a plunger 44, which is urged upwardly by a spring 45, such upward movement being limited by the engagement of a shoulder 46 on said plunger with a wall 47 in the casing.

Associated with the control valve device is a brake pipe quick recharge mechanism comprising a piston 49 contained in a chamber 50 and a slide valve 51 contained in the chamber 32, a spring 52 being provided in chamber 50 to engage said piston and urge the piston downwardly. For controlling the operation of the brake pipe quick recharge mechanism a valve 53 is provided, which valve has a stem 54 extending through a bore in the casing wall 55, the portion operative in said wall being fluted. The lower end of the valve stem 54 is engaged by a follower 56 which is operated upon deflection of a diaphragm 57. A spring 59 contained in chamber 60, urges the diaphragm 57 away from the stem 54, thus normally permitting the valve 53 to be seated by the pressure of a spring 58.

The application valve device 10 comprises a casing having a chamber 61 containing a piston 62, a smaller chamber 63 containing a piston 64, said pistons being operatively connected by a stem 65. A slide valve 66 is contained in a valve chamber 67 and is adapted to be operated by an extension 68 of the piston stem 65. A valve piston 69 is operatively mounted in a bore in a cap nut 70 and is normally urged to the left against a seat ring 71 in the casing by the pressure of a spring 72. A stem 73, having screw-threaded engagement in said valve piston, extends through a passage 74 and is adapted to be engaged by the end portion 75 of the application piston stem extension 68 for unseating said valve, so as to establish communication between a chamber 76 and the chamber 67.

Contained in the pipe bracket 6 is a brake pipe vent valve mechanism comprising a piston 77 and a valve 78 operatively connected to said piston by a stem 79. The piston 77 is subject to the fluid under pressure in a chamber 80 at its lower face and to atmospheric pressure in a chamber 81 at its upper face. The vent valve 78 is provided with an upwardly extending guide portion 82 and is adapted to seat on a seal ring 83 for normally cutting off communication between a chamber 84, which is connected to the brake pipe 13 through passage and pipe 12 and a chamber 85 which is connected to the atmosphere through a passage 86. A spring 87 is provided in chamber 84 to normally maintain the vent valve 78 seated against the seat ring 83.

Also contained in the pipe bracket 6 is the operating reservoir 16, an application chamber 88 and a quick service chamber 89.

The quick service chamber 89 is provided with an opening through the casing wall which is adapted to receive a screw-threaded plug 90 which has extensions 91 and 92 at opposite ends of the screw-threaded portion, the extension 91 being longer and of greater volume than the extension 92. The plug 90 is screw-threaded in such a manner that either the extension 91 or 92 may be inserted into the quick service chamber 89, in order to vary the volume of said chamber in proportion to the displacement of the extension inserted.

The brake cylinder supply pressure limiting valve device comprises a pipe bracket 93, upon which is mounted an emergency limiting valve mechanism 94, a service limiting valve mechanism 95 and mechanism 96 operative to adjust the emergency limiting valve and service limiting valve mechanisms in accordance with the load on the car.

The emergency limiting valve mechanism comprises a valve 97 having a fluted stem 98 extending through a suitable bore in a partition wall 99 and engaging one side of a diaphragm 100. The valve 97 is adapted to be unseated when the diaphragm 100 is deflected upwardly, a spring 101 being provided to urge said valve to its seat.

For operating the diaphragm 100, a follower 102 is provided which is subject to the pressure of a coil spring 103. The lower end of the coil spring 103 engages an adjusting nut 104 on a screw-threaded stem 105 of a plunger member 106, which is operated by a cross head 107, the position of which is adapted to be varied in accordance with the load on a car and thus proportionately vary the pressure of the coil spring 103 on the diaphragm 100, as will be more fully explained hereinafter. The screw-threaded portion 105 of the plunger member 106 is provided with a central bore adapted to slidably receive the stem 108 of the follower 102, so as to provide a relative telescopic movement therebetween.

The service limiting valve mechanism 95 is similar in construction to the emergency limiting valve 94, comprising a valve 109, a spring 110 for urging said valve to its seat, a diaphragm 111 for unseating said valve, a follower 112 engaging said diaphragm and subject to the pressure of an adjustable coil spring 113, a plunger member 114 operated by the cross head 107 for varying the pressure of coil spring 113 in accordance with the load on a car, relative movement being provided between the plunger member 114 and follower stem 115.

The emergency limiting valve spring 103 and service limiting valve spring 113 may be initially adjusted by the adjusting nut 104 and adjusting nut 117, respectively, to provide a predetermined maximum emergency and service braking power on an empty car, in the manner to be hereinafter described, the adjustment of the emergency limiting valve spring 103 being such as to provide a greater braking power in an emergency application of the brakes than is obtained in a service application of the brakes as governed by the adjustment of the service limiting valve spring 113.

The cross head 107 is mounted on a shaft 116 adapted to slidably operate through a suitable bore in a lug 118 projecting from the depending portion of the adjusting mechanism casing 96. For operating said cross head through the medium of said shaft, a bell crank having projecting arms 119, 120, and 121 is provided. Said bell crank is pivotally mounted on a projecting lug 122 of the casing 96. The bell crank arm 119 has at its outer end a roller bearing 123 adapted to engage the lower end of the shaft 116. The bell crank arm 120 is connected through a link 124 to a rack 125 having locking teeth on one side, which teeth are adapted to be engaged by the teeth 126 on the stem 127 of a locking piston 128, for locking the crank arms and cross head in an adjusted position. The bell crank arm 121 is connected through a rod 129 to a lever 130 carried at the outer end of a stem 160, which is operatively connected to a strut piston 131 contained in a chamber 132, a spring 219 being provided to urge said piston to the position shown in the drawing. Connected to the opposite end of the lever 130 is an adjustable tie rod 133, the opposite end of which is pivotally connected to the projecting arm 135 of a cam like shoe 134, said shoe being pivotally mounted on a bracket 136, which may be rigidly fixed on the body of a car. When adjusting the setting of the emergency valve mechanism 94 and service valve mechanism 95, the outer end of the shoe 134 is adapted to engage a fixed stop 137 carried by the spring plank of the car truck.

The emergency and service limiting valve mechanisms are permitted to be adjusted in accordance with the load on the car, only when the car is at a stop to take on or to discharge passengers and the car doors are opened. For this purpose, pipe 138 is connected to the door opening pipe of the usual door engine, so that fluid under pressure supplied to open the car doors, is also supplied to pipe 138.

Fluid under pressure supplied to pipe 138 flows through passage 139 to chamber 140 at the upper side of a valve piston 141, which is normally held seated against a seat ring 142 by the pressure of a spring 143. In this seated position of valve piston 141, a ball check valve 144 is lifted from its seat by an upwardly extending stem 145 from said valve piston, and fluid under pressure is thus permitted to flow from chamber 140, past said ball check valve to passage 146 and from thence to the strut piston chamber 132. The fluid under pressure thus acting on the strut piston 131 forces said piston to the right. The bell crank arm 121 being normally locked in position by the tooth 126 of stem 127 of the locking piston 128, the rod 129 is also locked, so that outward movement of the strut piston rod 160 causes lever 130 to rotate about a pivot 147, thereby shifting the adjustable tie rod 133 to the right, causing the shoe 134 to rotate clockwise and engage the fixed stop 137.

When the pressure of fluid in the strut piston chamber 132 and acting on the upper face of the valve piston 141 inside of the seat rib 142, becomes slightly greater than the pressure of spring 143, said valve piston is shifted downwardly and seals against a gasket 148. In this position of said valve piston the ball check valve 144 seats and fluid under pressure is permitted to flow from chamber 140 to chamber 149 at the upper face of said valve piston and from thence through passage 150 to the left hand side of the locking piston 128, wherein said pressure overcomes the opposing pressure of a spring 151 and forces said piston to the right, thereby disengaging the tooth 126 on the stem 127 from the teeth on the rack 125.

When the strut piston 131 is shifted to the right, as above described, it is maintained in engagement with a stop 152 by the fluid under pressure in chamber 132. Thus when the bell crank arm 120 is released by operation of the locking piston 128 to the right, the pressure of the limiting valve springs 103 and 113 acting on the cross head 107 acts through the bell crank lever arms 119, and 121, rod 129, lever 130 and the tie rod 133 to maintain the shoe 134 in engagement with the fixed stop 137.

If the car load is increased, the car body carrying the shoe 134 moves toward the fixed stop 137 on the car truck, causing the shoe arm 135 to rotate counterclockwise. This movement transferred back to the bell crank lever causes the arm 119 to rotate clockwise and shift the cross head 107 upwardly. The upward movement of the cross head pushes the adjusting plunger members 106 and 114 upwardly, thereby compressing or increasing the load of the limiting valve springs 103 and 113.

If the car load is decreased, then the car body moves away from the fixed stop 137, obviously causing the shoe arm 135 to rotate clockwise and bell crank arm 119 to rotate counterclockwise, which permits the cross head 107 to move down and decrease the pressure or load of the limiting valve springs 103 and 113.

It will thus be seen that the pressure of limiting valve springs 103 and 113 will be automatically changed as the car load is changed.

When the car load is increased, the clockwise rotation of bell crank arms 119 and 121 causes a similar rotation of arm 120, which operates through link 124 to pull the rack 125 downwardly, and if the car load is decreased, then the bell crank arm 121 operates to push the rack 125 upwardly, thereby positioning said rack in a position according to the car load.

In closing the car doors after the car is loaded, fluid under pressure is vented from pipe 138, thereby permitting fluid under pressure to be vented from the left side of the locking piston 128 through passage 150, valve piston chamber 149, past the unseated valve piston 141 and passage 139. The pressure of spring 151 then shifts the piston 128 to the left, causing tooth 126 on the piston stem 127 to engage in the teeth of rack 125, so as to lock said rack, the bell crank arms 119, 120 and 121, the cross head 107 and limiting valve springs 103 and 113 in their newly adjusted position.

After the pressure acting on the valve piston 141 is reduced slightly below the upwardly acting pressure of spring 143, said spring forces said valve piston upwardly to the position shown in the drawing, in which position the ball check valve 144 is unseated and permits the fluid under pressure to be vented from the strut piston chamber 132 to the atmosphere through passage 146, past ball check valve 144, through chamber 140, passage 139 and the vented pipe 138. The pressure spring 133 then forces the strut piston 131 to the position shown in the drawing, such movement rotating the lever 130 about the fulcrum 147, which becomes fixed by the locking of the rack 126 in its adjusted position. This clockwise rotation of lever 130 acts through the adjustable tie rod 133 and arm 135 to pull the shoe 134 away from the stop 137 to the position shown in the drawing, in which it is normally carried.

Fluid under pressure is supplied from the main reservoir 3 through pipe and passage 154 to chambers 155 and 156 of the emergency limiting valve and service limiting valve mechanisms, respectively.

The emergency limiting valve 97 is initially unseated by the pressure of the spring 103, so that fluid under pressure is thus permitted to flow from chamber 155 past said valve to chamber 157 at the upper side of the diaphragm 100 and from thence through passage and pipe 158 to the brake controlling valve device 1. When the fluid pressure acting on the upper side of the diaphragm 100 thus becomes slightly greater than the upwardly acting pressure of the emergency limiting valve spring 103, said diaphragm is deflected downwardly, permitting spring 101 to seat valve 97, so as to prevent further flow of fluid from chamber 155 to passage and pipe 158. If for any reason the pressure in passage and pipe 158 becomes reduced below the pressure of the spring 103, then said spring deflects diaphragm 100 upwardly, unseating valve 97 so as to permit the pressure on the upper side of the diaphragm to be built up again to a pressure slightly higher than the pressure of the spring 103. In this manner the emergency limiting valve mechanism 94 operates to maintain a supply of fluid under pressure in passage and pipe 158 substantially equal to the pressure and adjustment of the adjustable limiting valve spring 103.

The service limiting valve mechanism 95 operates to maintain a supply of fluid in a passage and pipe 159 in the same manner as the emergency limiting valve mechanism 94 operates to maintain a constant pressure supply in passage and pipe 158, the pressure of fluid in passage 159 being substantially equal to the pressure of the service limiting valve spring 113. This is obviously true, since as hereinbefore described, fluid at main reservoir pressure is supplied to the valve chamber 156, and the valve 109 being initially unseated, permits fluid under pressure to flow from chamber 156 to the upper side of the diaphragm 111 and from thence to passage and pipe 159. When the pressure acting on the upper side of diaphragm 111 slightly exceeds the pressure of spring 113, then said diaphragm is deflected downwardly, which permits valve 109 to seat and thus cut off further flow of fluid under pressure to passage and pipe 159.

As hereinbefore explained, it is understood that the adjusted pressure of the emergency limiting valve spring 103 is greater than that of the service limiting valve spring 113, so that the pressure permitted to build up in passage and pipe 158 by the emergency limiting valve spring is always greater than the pressure permitted to build up in passage and pipe 159 by the service limiting valve spring, irrespective of the adjustment of said springs, according to the car load.

In order to initially charge the brake controlling valve device 1, fluid under pressure is supplied to the brake pipe 13 by the operation of a brake valve device (not shown) on the leading car or locomotive and then flows from the brake pipe through pipe and passage 12 to the equalizing piston chamber 11, to the seat of the quick recharge slide valve 51 and to the vent valve chamber 84.

The fluid at brake pipe pressure in piston chamber 11, acts on the equalizing piston 14 and shifts said piston to the release position, as shown in the drawing, in which position a passage 161 is opened to establish communication from the piston chamber 11 to valve chamber 15, said passage containing a choke plug 162.

Fluid under pressure then flows from piston chamber 11 to valve chamber 15 at a rate governed by choke plug 162, and from thence through passage 17 to the operating reservoir 16, charging said reservoir to brake pipe pressure.

Running through the length of the train with the brake pipe 13 is a feed valve pipe 163, which is charged with fluid at a reduced pressure, as supplied from a main reservoir 3 through a feed valve device 4 and pipe 164.

Fluid at feed valve pressure flows from pipe 163 through pipe and passage 164 to the repeater valve chamber 40, charging said chamber, and also to the seat of the equalizing slide valve 18, and to chamber 29 above the valve loading diaphragm 28.

With equalizing slide valve 18 in release position, the repeater valve piston chamber 36 is connected to the atmosphere through passage 165, passage 166 in the main slide valve 18, cavity 167 in the auxiliary slide valve 19, port 168 in the main slide valve 18 and an atmospheric passage 169. The repeater valve piston chamber 34, however, is supplied with fluid under pressure from the feed valve device 4, by way of pipe and passage 164, cavity 170 in the main slide valve and passage 171, and since the piston chamber 36 is at atmospheric pressure the pressure in chamber 34 acting on the upper face of the piston 35 shifts said piston, the piston 37 and the slide valve 39 downwardly to the release position, as shown in the drawing. In moving to release position, the piston 37 engages the plunger 44 and shifts said plunger downwardly against the pressure of the spring 45. It will here be noted that the movement of the repeater pistons 35 and 37 to release position is controlled by and occurs when the equalizing slide valve 18 is in release position, as shown in the drawing.

In the release position of the repeater slide valve 39, the quick service chamber 89 is connected to the atmosphere through passage 172, cavity 173 in the repeater slide valve 39 and atmospheric passage 174. The application cylinder 61 and application chamber 88, to which the application cylinder is connected by passage 175, is also connected to the atmosphere through passage 176, cavity 177 in the slide valve 39 and atmospheric passage 178.

The application cylinder 61 being thus vented, the application piston 62 and slide valve 66 assume the position shown in the drawing in releasing the brakes, as will be fully explained hereinafter, in which position the brake cylinder 5 is connected to the atmosphere through pipe and passage 179, valve chamber 67, port 180 in slide valve 66, ports 185 in the slide valve seat and the atmospheric passage 181, and the valve piston 69 is seated against the seat rib 71 by the pressure of spring 72. Fluid at main reservoir pressure is supplied through passage 154 to chamber 76 surrounding the valve piston 69 and flows therefrom through equalizing ports 182 in the valve piston guide and ports 183 in the valve piston wall to chamber 184 within said valve piston and therein supplements the pressure of spring 72 to normally maintain said valve piston seated.

The fluid under pressure supplied to the equalizing valve chamber 15 acts on the upper exposed faces of the main slide valve 18 and auxiliary slide valve 19 thereby urging said valves against their respective seats. Fluid under pressure also flows from said valve chamber through a passage 186 to diaphragm chamber 23 and acts upwardly on the diaphragm 28. Assuming the pressure of fluid supplied by the feed valve device 4 through pipe and passage 164 to chamber 29 at the upper side of said diaphragm to be equal to the pressure acting upwardly on the lower side of said diaphragm, the opposing forces acting on said diaphragm are equal.

In initially charging the equipment, fluid at feed valve pressure supplied to the diaphragm chamber 29, flows through perforations 33 in plate 31 to the brake pipe quick recharge valve chamber 32 and from thence through a port 187 to piston chamber 50 and through passage 188 to the upper side of the valve 53, which is normally seated. The fluid pressure thus becomes equal on the opposite sides of the piston 49, and the pressure of spring 52 acts to hold the piston 49 and slide valve 51 in the position shown in the drawing. As just mentioned, the valve 53 is normally seated. This is due to chamber 198 at the lower side of diaphragm 57 being at atmospheric pressure due to the connection to atmospheric passage 178 through which the application cylinder 61 is vented. The pressure of spring 59 on the upper side of diaphragm 57 therefore acts through the follower 56 to deflect the diaphragm downwardly which permits spring 58 to seat valve 53.

The fluid at the pressure supplied by the service limiting valve mechanism 95 flows through passage and pipe 159 to the brake controlling valve device 1 as hereinbefore described and from thence flows through passage 189, containing a choke plug 190, to the seat of the repeater slide valve 39, where said passage is lapped, when the repeater slide valve is in release position. The fluid at the pressure supplied by the emergency limiting valve mechanism 94 through passage and pipe 158 to the brake controlling valve device 1 flows through said passage to the seat of the equalizing slide valve 18, said passage being lapped by said slide valve in the release position.

With the brake equipment charged as above described, if it is desired to effect a service application of the brakes, the pressure in the brake pipe 13 is reduced in the usual well known manner. Since the equalizing piston chamber 11 is connected to the brake pipe 13 through passage and pipe 12, the pressure in said chamber reduces as the brake pipe pressure is reduced. When the pressure in the piston chamber 11 is reduced slightly below the pressure in the equalizing valve chamber 15, the pressure in chamber 15 and the connected operating volume 16 acting on the left hand side of the equalizing piston 14, shifts said piston and the slide valves 18 and 19 outwardly to service position, in which position the projection 191 on the right hand face of the equalizing piston engages the spring pressed plunger 192.

In service position of the equalizing slide valves 18 and 19, fluid under pressure is vented from the repeater valve piston chamber 34 through passage 171, port 193 in the main slide valve 18, which registers with passage 171 in the seat, cavity 167 in the auxiliary slide valve 18, port 168 in the main slide valve 18 and the atmospheric passage 169, and fluid under pressure is supplied to the repeater valve piston chamber 36 from the feed valve device 4 by way of pipe and passage 164, cavity 170 in the main slide valve, which cavity connects passage 164 to passage 165 leading to the piston chamber 36.

The repeater valve piston chamber 34 being thus vented, and piston chamber 36 being charged with fluid under pressure, the pressure in chamber 36 shifts the repeater valve pistons 37 and 35 and the slide valve 39 upwardly to service position, in which position the piston 35 engages a gasket 194 and compresses the spring 42.

In service position of the repeater slide valve 39, the quick service chamber 89 is connected to the brake pipe 13 through passage 172, cavity 217 in said slide valve, passage 195 past a ball check valve 196 and through passage 197 to the equalizing piston chamber 11 and from thence through passage 12. This permits fluid under pressure from the brake pipe 13 and equalizing piston chamber 11 to flow to the quick service chamber, which is normally at atmospheric pressure, thereby effecting a local quick service reduction in brake pipe pressure in the usual manner.

In service position of the repeater slide valve 39, the cavity 177 connects passage 189 from the service limiting valve mechanism 95 to passage 176, thereby permitting fluid under pressure to flow from passage 159 through passage 189 to passage 176 and to the application chamber 88 and from said chamber through passage 175 to the application piston chamber 61. The fluid under pressure thus supplied to the application piston chamber shifts the application piston to the right, causing the slide valve 66 to lap the brake cylinder exhaust passage 185 and causing the end portion 75 of the application piston stem to engage the valve piston stem 73 and unseat the valve piston 69, thereby permitting fluid at main reservoir pressure to flow from chamber 76, through passage 74 to chamber 67 and from thence through passage and pipe 179 to the brake cylinder 5, thereby applying the brakes.

The rate of build up in pressure in the application chamber 88 and application cylinder 61 is governed by the flow rate through the restricted opening in the service choke plug 190 in passage 189, and the maximum pressure build up obtainable in said chamber and cylinder is governed by the adjustment of the service limiting valve mechanism 95, the operation of which has been hereinbefore described.

The application valve chamber 67 is connected to the right hand side of the application piston 62 through a port 199 in the piston 64, so that if the rate of pressure build up in the valve chamber 67 and consequently in the brake cylinder 5 and on the right hand side of the application piston 62 tends to exceed the rate of build up in the application piston chamber 61, then the higher pressure shifts the application piston to the left, permitting valve piston 69 to partly close and thereby throttle the supply of fluid under pressure to the valve chamber 67 to a degree substantially equal to the rate of supply to the application piston chamber 61. When the pressure in the application piston chamber is built up to the setting of the service limiting valve mechanism 95, then the pressure in the application valve chamber 67 builds up to a degree slightly in excess and then shifts the application piston 62 to lap position, in which the valve piston 69 is seated by the pressure of spring 72, thus preventing further flow of fluid under pressure to the brake cylinder 5.

When a service application of the brakes is made, the brake pipe pressure and the pressure in the equalizing piston chamber 11 is reduced at a predetermined service rate. As soon as the repeater slide valve 39 moves to service position, the operating volume 16 and equalizing valve chamber 15, which are connected by passage 17, are connected to the atmosphere through passage 200, cavity 173 in the repeater slide valve and an atmospheric passage 174, thereby permitting the fluid under pressure in said volume and chamber to be vented at a rate governed by the flow area of the restricted port in a choke plug 201, the flow area of said choke plug being such as to permit the pressure in the equalizing valve chamber to reduce at substantially the same rate as the pressure is reduced in the equalizing piston chamber 11. This is necessary, so that the equalizing piston 14 will be operative to move to lap position immediately upon stopping the reduction in brake pipe pressure, as will now be explained.

If it is desired to limit the degree of brake application, then the desired reduction is made in brake pipe pressure, which is effective in the equalizing piston chamber 11. When the pressure in the equalizing valve chamber 15 becomes reduced to a degree slightly less than the reduced pressure in piston chamber 11, the equalizing piston 14 and graduating valve 19 are moved to the left to lap position, in the usual manner.

In lap position of the graduating valve 19, cavity 202 connects port 203 from cavity 170 to port 193 which registers with passage 171, thereby permitting fluid at feed valve pressure to flow from passage 164 to passage 171 and from thence to the repeater piston chamber 34. The repeater piston chamber 36 being charged with fluid at feed valve pressure in the same manner as in service application position of the equalizing slide valves 18 and 19, the fluid pressures are thus equalized in the repeater piston chambers 34 and 36, which permits the pressure of spring 42 to shift the pistons 35 and 37 and the slide valve 39 downwardly to an intermediate or lap position, in which piston 37 just engages the upper end of the plunger 44.

In lap position of the repeater slide valve 39, passage 159 from the service limiting valve mechanism 95 is lapped, thereby preventing further flow of fluid under pressure to the passage 176 and from thence to the application chamber 88 and cylinder 61. Thus, when the brake cylinder pressure, effective in the application valve chamber 67 is built up to a degree slightly exceeding the fluid pressure in the application piston chamber 61, the application piston 62 operates in order to cut off the fluid pressure supply to the brake cylinder, in the same manner as hereinbefore described.

In lap position of the repeater slide valve 39, passage 200 from the operating chamber 16 is disconnected from the atmospheric passage 174, thereby limiting the degree of reduction in pressure in the operating chamber to substantially that in the brake pipe. It is thus obvious that if a further brake application is desired, or if it is desired to apply the brakes in a series of steps, that the repeater valve device will be operated from service position to lap position by reducing the brake pipe pressure in steps, and as a result will cause a build up of brake cylinder pressure in corresponding steps.

In order to release the brakes after a service application, the pressure of fluid in the brake pipe 13 is increased in the usual manner, causing a corresponding increase in pressure in the equalizing piston chamber 11. When the pressure in the chamber 11 thus becomes slightly greater than the reduced pressure in the valve chamber 15, the piston 14 is shifted to the left carrying the slide valves 18 and 19 to the release position, in which the fluid under pressure is vented from the repeater piston chamber 36, and fluid at feed valve pressure is supplied to the repeater piston chamber 34, thereby causing the repeater valve pistons 35 and 37 to operate and shift the slide valve 39 downwardly to the release position, as was described in initially charging the equipment.

In release position of the repeater slide valve, cavity 177 connects passage 176 from the application chamber 88 and application cylinder 61 to atmospheric passage 178, thereby permitting the fluid under pressure to be vented from the application piston chamber 61. The fluid at brake cylinder pressure acting on the right side of the application piston 62 then shifts said piston to the left, causing the slide valve 66 to move until port 180 registers with exhaust passage 185. Fluid under pressure is thereby vented from the brake cylinder 5 to the atmosphere through pipe and passage 179, valve chamber 67, exhaust passages 185 and the atmospheric passage 181.

In the application cylinder exhaust passage 178 is placed a choke plug 204, which is adapted to govern the rate of release of fluid under pressure from the application cylinder 61 and application chamber 88. Since this choke plug will not permit the flow of fluid under pressure through it as fast as fluid under pressure can be supplied from the application cylinder 61, a pressure is built up on the right side of said choke substantially equal to the pressure in the application cylinder, and since the passage 178 is connected to diaphragm chamber 198, application cylinder pressure becomes effective on the lower side of diaphragm 57. The diaphragm 57 is thereby deflected upwardly, unseating valve 53 and permitting fluid under pressure to be vented from the brake pipe quick recharge piston chamber 50 through passage 188, past valve 53 to chamber 60 and through an atmospheric port 205. The pressure of fluid in the valve chamber 32 then shifts the piston 49 and slide valve 51 upwardly, compressing the spring 52 and causing the slide valve 51 to uncover passage 12. Fluid at feed valve pressure is thereby permitted to flow from passage 164 from the feed valve device, through chamber 29, perforations 33 in plate 31, valve chamber 32 and from thence through passage and pipe 12 to the brake pipe 13, thereby causing a sudden local increase in brake pipe pressure thus aiding in the recharge of the brake pipe.

When the application cylinder pressure, which is effective in the diaphragm chamber 198, is reduced to a predetermined degree, the pressure of spring 59 deflects the diaphragm 57 downwardly, permitting spring 58 to seat valve 53. With valve 53 seated, a pressure builds up again in the quick recharge piston chamber 50, by way of port 187 in piston 49, thereby permitting spring 52 to shift the piston 49 and slide valve 51 back to the position shown in the drawing, in which passage 12 is lapped and the flow of fluid under pressure to the brake pipe from the feed valve device is cut off.

Since the brake pipe quick recharge slide valve 51 is held in its upper position until the application cylinder pressure is reduced to a predetermined degree, it is obvious that fluid under pressure is permitted to flow from the feed valve device to the brake pipe a degree of time proportional to the application cylinder pressure or in proportion to the brake pipe reduction made in effecting the service application of the brakes. To be more specific, if a full service reduction in brake pipe pressure is made, the amount of fluid under pressure permitted to flow to the brake pipe in recharging is greater than if only a partial service application is made.

When the repeater slide valve 39 moves to release position, passage 206 is uncovered, which permits fluid at feed valve pressure to flow from valve chamber 40, through said passage, past a ball check valve 207 and through a passage 208 to the equalizing valve chamber 15 and from thence through passage 17 to the operating chamber 16. In releasing the brakes, the valve chamber 15 and operating chamber 16 are thus charged from two sources, the one source being that just described and the other source being from the brake pipe 13 by way of equalizing piston chamber 11 and passage 161 around the equalizing piston 14. This hastens the recharge of the chambers 15 and 16 and since the brake pipe is quickly recharged in the manner hereinbefore described, the whole equipment is quickly operative to apply the brakes again after a release is initiated.

A spring 208 is provided to seat the ball check valve 207 and is of such pressure as to prevent the flow of fluid under pressure to the equalizing valve chamber 15, when the pressure in said chamber rises to a degree slightly less than the normal brake pipe pressure carried and effective in the equalizing piston chamber 11, as for instance, if the normal brake pipe pressure carried is 70 pounds, then the spring 208 will prevent flow past ball check valve 207, when the pressure in valve chamber 15 and on the upper side of said ball check valve becomes 65 pounds. This is desirable in order to insure that the brake pipe pressure will shift the equalizing piston 14 and slide valves 18 and 19 to the full release position, as shown in the drawing, which will occur since the final degree of recharge of the equalizing valve chamber must be effected through passage 161, which is not opened until the equalizing piston is in full release position.

If it is desired to effect an emergency application of the brakes, the fluid under pressure is suddenly vented from the brake pipe 13, thereby causing a sudden reduction in pressure in the equalizing piston chamber 11. The pressure in the equalizing valve chamber 15, then shifts the equalizing piston 14 and slide valves 18 and 19 to emergency position, in which the projection 191 on the equalizing piston 14 engages the spring pressed plunger 192, forcing it to the right until the piston 14 engages the gasket 209.

In emergency position of the equalizing slide valves 18 and 19, the repeater valve pistons 35 and 37 and slide valve 39 are operated, in the same manner as in service position, to supply fluid at the pressure supplied by the service limiting valve mechanism 95 to the application piston chamber 61, in order to apply the brakes. Also, a cavity 210 in the equalizing slide valve 15 connects passage 158 from the emergency limiting valve mechanism 94 to passage 176 from the application chamber 88, so that fluid at the pressure supplied by the emergency limiting valve mechanism is also supplied to the application chamber 88 and flows therefrom through passage 175 to the application cylinder 61, the rate of supply from the emergency limiting valve mechanism being governed by the flow area of the restricted port through a choke plug 211. The flow area through the choke plug 211 may be the same or different than the flow area through the service choke plug 190, however in either case, the rate of build up of pressure in the application cylinder 61 is governed by the combined flow areas through both of said choke plugs. Therefore, the rate at which fluid under pressure is supplied to the application cylinder 61 is greater than when a service application of the brakes is effected, and the final pressure obtained in said cylinder is also greater, since it is governed by the adjustment of the emergency limiting valve mechanism 94, which has been hereinbefore described.

When an emergency application of the brakes is effected, the sudden build up of pressure in the application piston chamber 61 shifts the application piston 62 to the left, causing the slide valve 66 to lap the brake cylinder exhaust passages 185 and unseating the valve piston 69, which permits fluid under pressure to flow to the brake cylinder 5 and apply the brakes, the rate of such flow being governed by the rate of build up of pressure in the application piston chamber 61, in the same manner as when a service application of the brakes is effected, as hereinbefore described.

When the equalizing slide valve 18 moves to emergency position in effecting an emergency application of the brakes, a passage 212 is uncovered and thus connected to the equalizing valve chamber 15. Fluid under pressure is thus permitted to flow from the valve chamber 15 and operation chamber 16 through said passage to the vent valve piston chamber 80, wherein said pressure acting on the piston 77, shifts said piston upwardly, thereby unseating the vent valve piston 78, which permits the fluid under pressure in the brake pipe 13 to be suddenly vented to the atmosphere through pipe and passage 12, vent valve chamber 84, ports 213, chamber 85 and from thence through the atmospheric passage 86. This sudden venting of fluid under pressure from the brake pipe is adapted to serially transmit the emergency action throughout the brake pipe, in the usual well known manner.

In order to release the brakes after an emergency application, fluid under pressure is again supplied to the brake pipe 13 and flows therefrom to the equalizing piston chamber 11, wherein said pressure acts on piston 14, shifting said piston and the slide valves 18 and 19 to release position. The repeater valve pistons 35 and 37 then are operated to shift the slide valve 39 downwardly to release position, in which position the equalizing valve chamber 15 and the operating chamber 16 are quickly recharged with fluid under pressure, and fluid under pressure is vented from the application piston chamber 61, causing a quick recharge of the brake pipe, and the release of the brakes, in the same manner as in releasing after a service application of the brakes, as hereinbefore described.

If desired, this brake controlling mechanism may be simplified by using only the emergency limiting valve mechanism 94 for supplying fluid under pressure for both service and emergency applications of the brakes. In such a case, the service limiting valve mechanism 95 may be removed from the pipe bracket 93 and the passage 154 connecting the main reservoir 3 thereto is plugged with a pipe plug (not shown) at the location 214 in the pipe bracket. The pipe 159 connecting to the brake controlling valve device 1 is removed, the plug 215 is next removed, and a pipe plug (not shown) is then placed in the opening where pipe 159 was formerly carried. By effecting these changes, fluid under pressure is permitted to flow from the emergency limiting valve mechanism 94 through passage and pipe 158 to the brake controlling valve device 1 and from thence through passage 158 to the seat of the equalizing slide valve in the same manner as hereinbefore described, but on account of the above mentioned modifications, fluid at the pressure supplied by the emergency limiting valve mechanism is also permitted to flow from passage 158 through a passage 216 to passage 189, which was formerly supplied with fluid under pressure from the service limiting valve mechanism 95.

With the above modifications effected, when a service application of the brakes is effected and the repeater slide valve 39 moves upwardly to service position, fluid under pressure is permitted to flow from the emergency limiting valve mechanism through pipe and passage 158, passage 216, passage 189 containing the service choke plug 190, cavity 177 in the repeater slide valve 39 and passage 176 to the application chamber 88 and from thence to the application piston chamber 61, in order to apply the brakes in the same manner as hereinbefore described.

In effecting a service application of the brakes, when the pressure in the equalizing valve chamber 15 is reduced to a degree slightly below the reduced brake pipe pressure in the equalizing piston chamber 11, the equalizing piston 14 moves the auxiliary slide valve 19 to lap position, in which position fluid under pressure is supplied to the repeater valve piston chamber 34 and since fluid under pressure is also supplied to the repeater valve piston chamber 36, the repeater valve is moved to lap position, in the manner more fully explained hereinbefore. In lap position of the repeater slide valve the supply of fluid under pressure is cut off from the emergency limiting valve mechanism 94 to the application chamber 88 and cylinder 61. It will thus be noted that fluid under pressure is permitted to flow to the application chamber and cylinder for a degree of time governed by the degree of brake pipe reduction or the time the equalizing valve piston 14 remains in service position. The degree of pressure obtained in the application cylinder 61 and consequently in the brake cylinder, therefore depends upon the degree of brake pipe reduction, the flow area through the choke plug 190, and the pressure supplied by the emergency limiting valve mechanism 94.

According to my invention, with the car fully loaded and the pressure supplied by the emergency limiting valve mechanism 94 therefore greatest, the flow area through the choke plug 190 is such, that while a full service reduction in brake pipe pressure is being effected, the pressure obtained in the application cylinder 61 will be the maximum permissible in a service application of the brakes. More specifically, with a car fully loaded, if the maximum application cylinder pressure, and therefore brake cylinder pressure, permitted in a service application of the brakes is 50 pounds and the adjustment of the emergency limiting valve mechanism is such as to supply fluid at 70 pounds, then the service choke plug 190 will permit 50 pounds pressure to build up in the application cylinder 61, while a full service reduction in brake pipe pressure is being effected, such a reduction being for instance from 70 pounds, normal brake pipe pressure, to 50 pounds. If the car is less than fully loaded, the adjustment of the emergency limiting valve mechanism is such as to supply a pressure of less than 70 pounds, and under such a condition the pressure built up in the application cylinder will obviously be less while a full service reduction in brake pipe pressure is being effected. Likewise, if only a partial service application of the brakes is effected, the pressure obtained in the application chamber 61 will vary in accordance with the adjustment of the emergency limiting valve mechanism, for the same degree of brake pipe reduction.

It is thus evident that the emergency limiting valve mechanism used in conjunction with the choke plug 190, of predetermined flow area, is employed to vary the brake cylinder pressure obtained in a service application of the brakes in accordance with the load carried by a car, whereas, when an emergency application of the brakes is effected, the brake cylinder pressure obtained will be governed only by the adjustment of the emergency limiting valve mechanism in the manner hereinbefore described.

As hereinbefore described, in order to hasten a service application of the brakes, fluid under pressure is vented from the brake pipe 13 to the quick service chamber 89 by way of pipe and passage 12, equalizing piston chamber 11, passage 197, past the ball check valve 196, through passage 195, cavity 173 in the repeater slide valve 39, and passage 172. The volume of this quick service chamber must be within certain proportional limits to the volume of the brake pipe carried on a car, so as to effect the proper degree of quick service action. In order to change the volume of said chamber to suit the brake pipe volume condition on a car to which this valve device may be adapted, the screw-threaded plug 90 is provided, having the extensions 91 and 92. In case the brake pipe volume on the car is small, the extension 91 is inserted in the chamber 89 and the plug 90 is then screwed into the casing. The extension 91 has a certain volume, which obviously displaces a certain volume in chamber 89, thereby reducing the effective volume in said chamber. If the brake pipe volume on the car is large, then the shorter extension 92 is inserted into chamber 89, thereby causing the effective volume of chamber 89 to be greater than when the extension 91 is inserted in said chamber.

As hereinbefore described, the upper exposed faces of the equalizing slide valves 18 and 19 are subject to the pressure of fluid in the valve chamber 15. This pressure acting downwardly on said valves, causes said valves to offer a certain resistance to movement by the piston 14, and if the fluid pressure in the valve chamber is reduced, then the valves will tend to move more easily and to a certain extent destroy the operating stability of the mechanism.

In order to maintain the stability of the equalizing valves substantially constant, the diaphragm 28, follower 27, lever 24, plunger 21 and roller 20 are provided. When the system is fully charged, the pressure in valve chamber 15, acting upwardly in chamber 23 on the lower side of the diaphragm, may balance the pressure of fluid constantly supplied by the feed valve device 4 to chamber 29 and acting downwardly on said diaphragm. In such a case, the diaphragm 28 will be in a state of equilibrium.

If a brake pipe reduction is effected, the pressure in valve chamber 15 and chamber 23 at the lower side of diaphragm 28 is reduced a corresponding degree. Since the pressure in diaphragm chamber 29 is constant however, a pressure differential is created on the opposite sides of the diaphragm, the greater pressure being in the upper side and acting downwardly with a pressure equal to the reduction in valve chamber 15 or equal to the degree of brake pipe reduction. Thus, assuming the brake pipe pressure is reduced 10 pounds, the pressure on the lower side of diaphragm 28 is reduced 10 pounds below the pressure on the upper side of said diaphragm. Consequently, this difference in pressure on the opposite sides of said diaphragm acts downwardly through follower 27, lever 24, plunger 21 and roller 20 on the upper side of slide valve 19, thereby forcing said valve and slide valve 18 toward their seats with a pressure substantially equal to the 10 pounds decrease in fluid pressure in the valve chamber 15.

It is obvious from the above description that the diaphragm 28 will act downwardly with a pressure proportional to the brake pipe reduction, and thereby maintain the slide valves 18 and 19 seated with a substantially constant pressure.

It is further obvious, that if for any reason it is desired to effect movement of the slide valves 18 and 19 to release position with a less difference in pressure on the opposite sides of the piston 14 than is required to move said valves to service position, the arms of lever 24 may be changed to effect the desired result.

While one illustrative embodiment of the invention has been described in detail, it is not my intention to limit its scope to that embodiment or otherwise than by the terms of the appended claims.

Having now described my invention what I claim as new and desire to secure by Letters Patent, is:

1. In a fluid pressure brake, the combination with a brake pipe, of a valve mechanism operative to effect an application of the brakes and a release of the brakes and a controlling valve device subject to the opposing pressures of the brake pipe and a chamber for controlling the operation of said valve mechanism, said valve mechanism being operative in effecting an application of the brakes to vent fluid under pressure from said chamber to the atmosphere.

2. In a fluid pressure brake, the combination with a brake pipe, and a brake cylinder, of a valve mechanism operated by fluid under pressure for supplying fluid under pressure to said brake cylinder to effect an application of the brakes and for venting fluid under pressure from said brake cylinder to effect a release of the brakes, valve means for controlling the operation of said valve mechanism, and a controlling valve device subject to the opposing pressures in the brake pipe and a chamber for controlling the operation of said valve means, said valve means being operative when the brakes are being applied to vent fluid under pressure from said chamber to the atmosphere.

3. In a fluid pressure brake, the combination with a brake pipe, of an equalizing valve device subject to the opposing pressures of said brake pipe and a chamber, a repeater valve device controlled by the operation of said equalizing valve device and operative to control the application and release of the brakes on a car, said repeater valve device being also operative to vent fluid under pressure from said chamber, when controlling an application of the brakes.

4. In a fluid pressure brake, the combination with a brake pipe, a brake cylinder, and a source of fluid under pressure, of an equalizing valve device subject to the opposing pressures of the brake pipe and a chamber, and a repeater valve device controlled by said equalizing valve device, said equalizing valve device operating upon a reduction in brake pipe pressure to effect the operation of said repeater valve device to control the supply of fluid under pressure from said source to the brake cylinder and to control the venting of fluid under pressure from said chamber, and operating upon an increase in brake pipe pressure to effect the operation of said repeater valve device to control the release of fluid under pressure from the brake cylinder.

5. In a fluid pressure brake, the combination with a brake pipe and a brake cylinder, of a repeater valve device having a valve movable to service position to control the supply of fluid under pressure to the brake cylinder, to lap position to cause fluid under pressure to be bottled in the brake cylinder and to release position to control the discharge of fluid under pressure from the brake cylinder, and a control valve device subject to the opposing pressures of said brake pipe and a chamber for controlling the operation of said repeater valve device, said repeater valve device being operative in service position to vent fluid under pressure from said chamber to the atmosphere.

6. In a fluid pressure brake, the combination with a brake pipe, brake cylinder and a source of fluid under pressure, of a valve device operative upon variations in brake pipe pressure and variations in pressure in a chamber for controlling the supply of fluid under pressure from said source to said brake cylinder to effect an application of the brakes, and for controlling the venting of fluid under pressure from said brake cylinder to the atmosphere to effect a release of the brakes, said valve device comprising a valve and a plurality of pistons for operating said valve.

7. In a fluid pressure brake, the combination with a brake pipe, of a repeater valve device operative to control the application and release of the brakes on a car, an equalizing valve device subject to variations in brake pipe pressure and variations in pressure in a chamber for governing the operation of said repeater valve device, said repeater valve device comprising a slide valve and a pair of connected pistons for operating said slide valve.

8. In a fluid pressure brake, the combination with a brake pipe, of a repeater valve device operative to control the application and release of the brakes on a car, said repeater valve device comprising a valve and a pair of connected fluid pressure operated pistons for operating said valve, an equalizing valve device subject to the opposing pressures of the brake pipe and a chamber for controlling the fluid pressures on said pistons.

9. In a fluid pressure brake, the combination with a brake pipe, of an equalizing valve device subject to the opposing pressures of said brake pipe and a chamber, a repeater valve device governed by the operation of said equalizing valve device for controlling the application and release of brakes on a car, said repeater valve device being operative in effecting an application of the brakes to vent fluid under pressure from said chamber to effect the movement of the equalizing valve device to a lap position and operative in effecting a release of the brakes, to supply fluid under pressure to said chamber to effect a recharge thereof.

10. In a fluid pressure brake, the combination with a brake pipe, of an equalizing valve device subject to the opposing pressures of said brake pipe and a chamber, a repeater valve device governed by the operation of said equalizing valve device for controlling the application and release of brakes on a car, said repeater valve device being operative in effecting an application of the brakes to vent fluid under pressure from said chamber to effect the movement of the equalizing valve device to a lap position and operative in effecting a release of the brakes, to supply fluid under pressure to said chamber to effect a recharge thereof, and means operative to limit the degree of recharge to a predetermined amount.

11. In a fluid pressure brake, the combination with a brake pipe, of an equalizing valve device subject to the opposing pressures of said brake pipe and a chamber, a repeater valve device governed by the operation of said equalizing valve device for controlling the application and release of brakes on a car, said repeater valve device being operative in effecting an application of the brakes to vent fluid under pressure from said chamber to effect the movement of the equalizing valve device to a lap position and operative in effecting a release of the brakes, to supply fluid under pressure to said chamber to effect a recharge thereof, and means to cut off said recharge when the pressure in said chamber is increased to within a predetermined degree of the normal brake pipe pressure carried.

12. In a fluid pressure brake, the combination with a brake pipe, of an equalizing valve device subject to the opposing pressures in said brake pipe and a chamber, and operative in release position to establish communication through which fluid under pressure is supplied to said chamber, a repeater valve device for effecting an application and release of the brakes on a car, said repeater valve device being controlled by the operation of said equalizing valve device and operative when effecting an application of the brakes to vent fluid under pressure from said chamber, and operative when effecting a release of the brakes to supply fluid under pressure to said chamber to aid in the recharge thereof.

13. In a fluid pressure brake, the combination with a brake pipe of an equalizing valve device operative upon a sudden reduction in the pressure of fluid in said brake pipe to effect an emergency application of the brakes on a car, a repeater valve device operatively controlled by said equalizing valve device and operative upon a reduction in brake pipe pressure to effect an application of the brakes and upon an increase in brake pipe pressure to effect a release of the brakes.

14. In a fluid pressure brake, the combination with a brake pipe, of a service limiting valve mechanism adjustable in accordance with the load on a car to limit the degree of a service brake application, an emergency limiting valve mechanism adjustable in accordance with the load on the car to limit the degree of an emergency brake application, a source of fluid under pressure, a brake cylinder, valve means for controlling the supply of fluid under pressure from said source to said brake cylinder to effect an application of the brakes and for venting fluid under pressure from said brake cylinder to the atmosphere to effect a release of the brakes, an equalizing valve device operative upon a sudden reduction in brake pipe pressure to supply fluid under pressure from said emergency limiting valve mechanism to said valve means to effect an emergency application of the brakes, a repeater valve device operatively controlled by said equalizing valve mechanism and operative upon a reduction in brake pipe pressure to supply fluid under pressure from said service limiting valve mechanism to said valve means to effect an application of the brakes and operative upon an increase in brake pipe pressure to vent fluid under pressure from said valve means to effect a release of the brakes.

15. In a fluid pressure brake, the combination with load regulated means for limiting the braking power on a car in a service and in an emergency application of the brakes, of a valve device for controlling the application and release of the brakes, a brake pipe, and valve means operative upon a reduction in brake pipe pressure to establish a communication through which fluid under pressure is supplied from said load regulated means to said valve device for applying the brakes, said valve means being operative upon an increase in brake pipe pressure to close said communication and establish another communication through which fluid under pressure is vented from said valve device to effect a release of the brakes.

16. In a fluid pressure brake, the combination with a brake pipe and a brake cylinder, of valve means operative upon a sudden reduction in brake pipe pressure to supply fluid under pressure to said brake cylinder to effect an emergency application of the brakes, and operative upon a gradual reduction in brake pipe pressure to supply fluid under pressure to said brake cylinder to effect a service application of the brakes, a valve device adjustable according to the load on a car for determining the pressure of the fluid obtained in said brake cylinder in effecting an emergency application of the brakes and means cooperating with said valve means for determining the pressure of fluid obtained in said brake cylinder by the operation of said valve device in effecting a service application of the brakes.

17. In a fluid pressure brake, the combination with a brake pipe and a valve device for controlling the application and the release of the brakes, of an emergency limiting valve device, valve means operative upon a reduction in brake pipe pressure to supply fluid under pressure from said emergency limiting valve device to said valve device to effect an application of the brakes, said emergency limiting valve device determining the control pressure obtained in said valve device upon a sudden reduction in brake pipe pressure, and a choke plug interposed between said emergency limiting valve device and valve device for determining the control pressure obtained in said valve device upon a gradual reduction in brake pipe pressure.

18. In a fluid pressure brake, the combination with a brake pipe and a brake cylinder, of valve means operative upon a sudden reduction in brake pipe pressure to supply fluid under pressure to said brake cylinder to effect an emergency application of the brakes and operative upon a gradual reduction in brake pipe pressure to supply fluid under pressure to said brake cylinder to effect a service application of the brakes, a load regulated valve device for determining the pressure of the fluid obtained in said brake cylinder in an emergency application of the brakes, and means for determining the pressure of fluid obtained in said brake cylinder in a service application of the brakes, said means comprising a choke for governing the rate of flow of fluid under pressure from said load regulated means.

19. In a fluid pressure valve device, the combination with a slide valve and a fluid actuated piston for operating said slide valve, of means adapted to hold said slide valve seated comprising a plunger for engaging said slide valve, a diaphragm subject to fluid under pressure and a lever for connecting said diaphragm and plunger.

20. In a fluid pressure brake, the combination with a brake pipe, of a piston subject to the opposing pressures in said brake pipe and a chamber and a valve adapted to be operated by said piston, said valve being normally held seated by the pressure of fluid in said chamber, means controlled by said valve for reducing the pressure in said chamber upon a reduction in brake pipe pressure, and fluid pressure actuated means for maintaining a substantially constant seating pressure on said valve upon a reduction in pressure in said chamber, said fluid pressure actuated means comprising a plunger engaging said slide valve, a diaphragm subject to the opposing pressures in said chamber and a constant pressure, and a lever operatively connecting said plunger and diaphragm.

21. In a fluid pressure brake for a car, the combination with a brake pipe on said car, and a quick service reservoir, of valve means operative upon a reduction in brake pipe pressure to vent fluid under pressure from said brake pipe to said reservoir for effecting a quick service reduction in brake pipe pressure, said reservoir having an aperture, a double ended screw-threaded plug for closing said aperture and having oppositely disposed projections of different volumes, so that when the plug is screwed into the aperture, the effective volume of the reservoir is varied according to which projection extends into said reservoirs.

In testimony whereof I have hereunto set my hand, this 23rd day of September, 1929.

JOSEPH C. McCUNE.